Aug. 21, 1934.  H. F. PITCAIRN  1,971,017
MOUNTING STRUCTURE FOR AIRCRAFT SUSTAINING ROTORS
Filed June 1, 1931  3 Sheets-Sheet 2
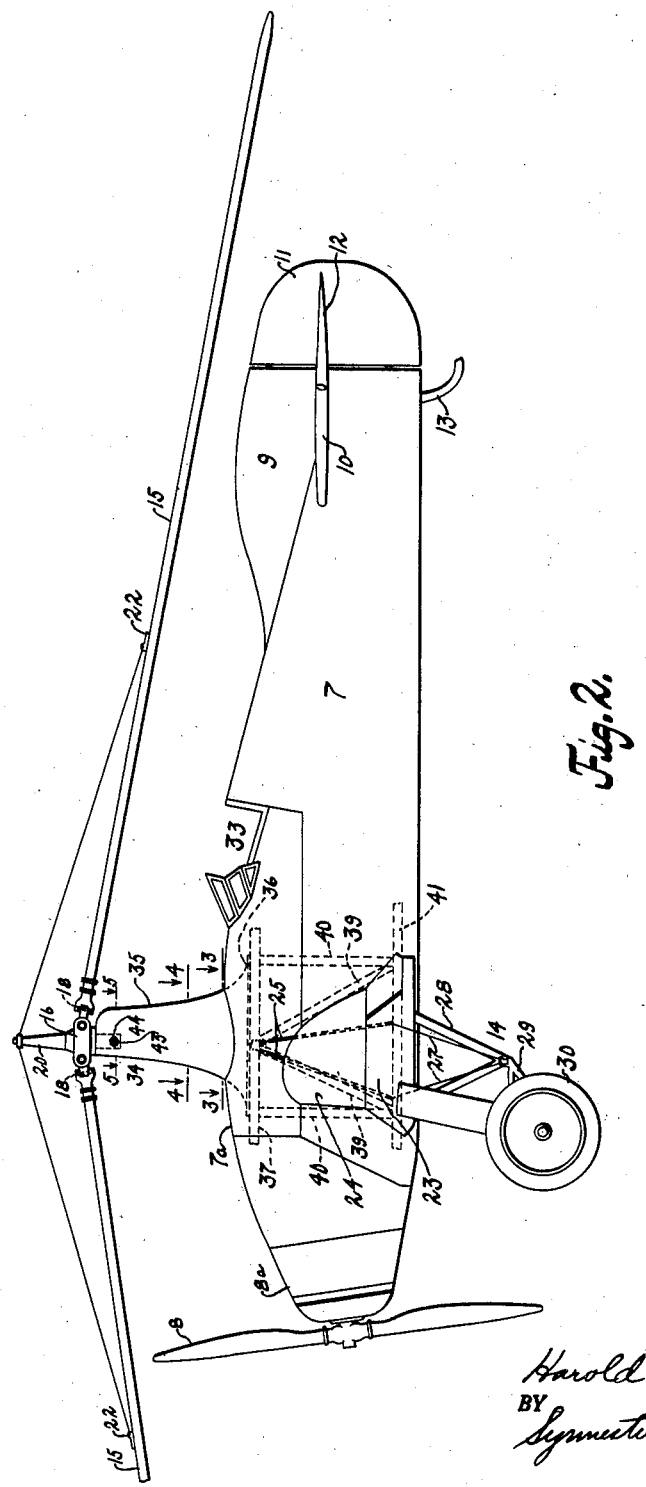
INVENTOR.
Harold F. Pitcairn
BY
Synnestvedt + Lechner
ATTORNEYS.

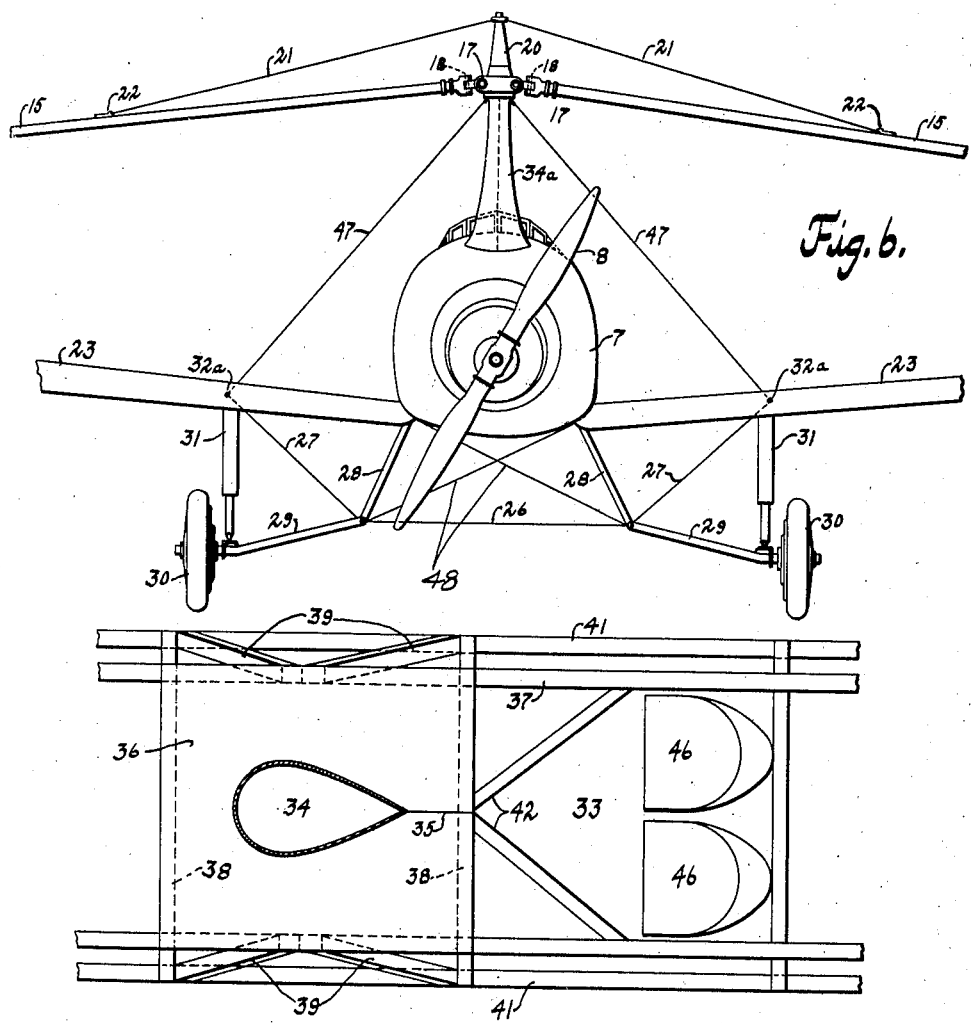
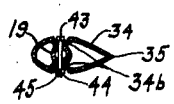

Patented Aug. 21, 1934

1,971,017

UNITED STATES PATENT OFFICE 1,971,017

MOUNTING STRUCTURE FOR AIRCRAFT SUSTAINING ROTORS

Harold F. Pitcairn, Bryn Athyn, Pa., assignor to Autogiro Company of America, Philadelphia, Pa., a corporation of Delaware Application June 1, 1931, Serial No. 541,200

4 Claims. (Cl. 244—19)

This invention relates to a mounting or supporting structure for aircraft sustaining rotors and is more especially concerned with a structure adapted to mount or support a rotor of the articulated blade type.

In general, the invention involves the improvement of the rotor mounting structure, both structurally and aerodynamically; the simplification and reduction of cost of manufacture and assembly thereof on the craft, the improvement of service characteristics of the craft, especially as regards ruggedness both of fuselage and of rotor mount, speed of the craft, reduction of vibration, minimization of deflection of the rotor mount, etc.; and the improvement of the general appearance of such craft without sacrifice of good visibility from the cockpit.

More specifically, this invention has in view the provision of a mounting structure preferably in the form of a single post element of hollow streamline form, the said post element having sufficient inherent strength and rigidity to support the rotor as against all normal strains incident to operation of the craft, for example, those resulting from normal flight operation, banking, landing, flapping movement of the rotor blades, and the like.

The general nature of the invention will be more apparent from a consideration of the following description making reference to the accompanying drawings in which two embodiments of the invention are illustrated.

Figure 2 is a side elevational view of the craft illustrated in Figure 1, this view also having a portion of one rotor blade broken away, and also including a dotted line showing of certain fuselage structural elements;

Figure 3 is an enlarged top plan view of a portion of the fuselage framing of the craft of Figures 1 and 2, this view being taken sectionally through the rotor mounting structure substantially as indicated by the section line 3—3 of Figure 2;

Figure 1:
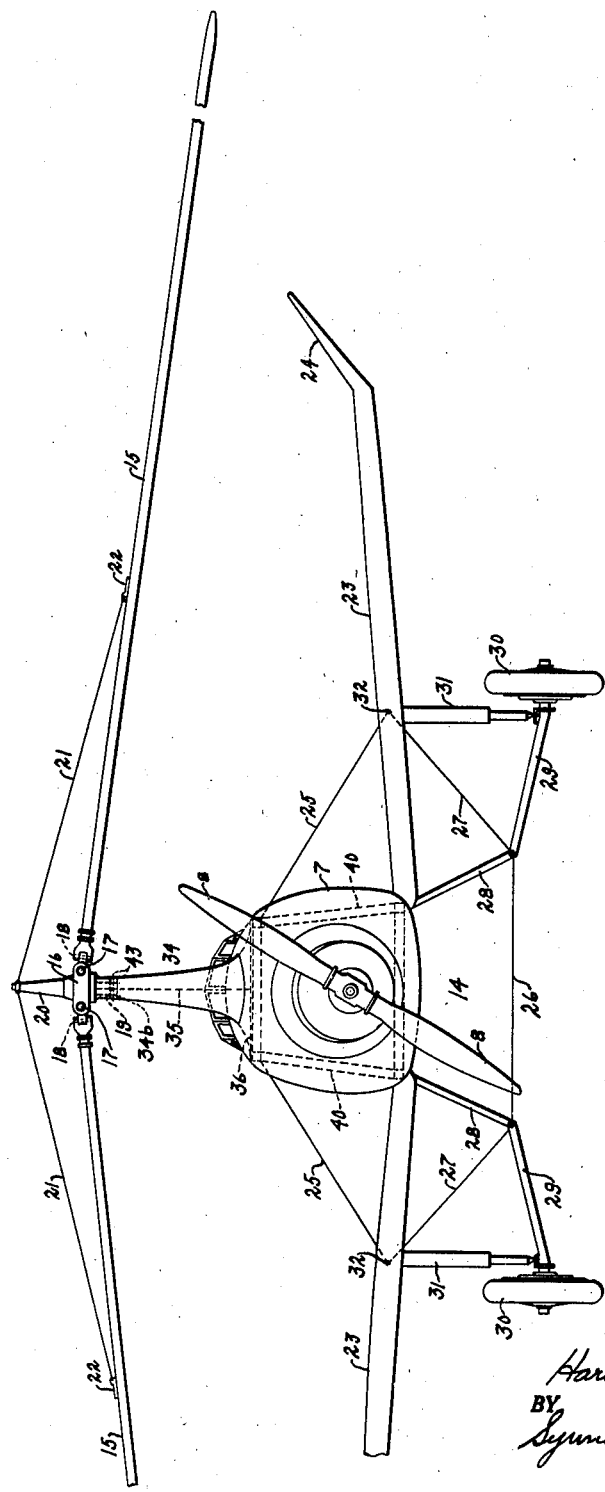
Figure 1 is a front elevational view of a craft of the rotative-wing type equipped with a mounting structure constructed in accordance with the present invention, this figure having a portion of a rotative wing or blade, as well as of a fixed lifting surface, broken away, and including a dotted line showing of certain fuselage structural members.

Figures 4 and 5 are detailed horizontal sectional views of the mounting structure taken, respectively, as indicated by the section lines 4—4 and 5—5 of Figure 2; and Figure 6 is a view similar to Figure 1 but illustrating a modified supporting structure.

Referring at the outset to Figures 1 and 2, I have illustrated the body or fuselage of the craft by the reference numeral 7. At the forward end of the fuselage I have arranged a forward propelling means including the propeller 8, and engine housed at 8a, while at the tail I have provided the craft with substantially fixed vertical and horizontal stabilizing elements 9 and 10. In addition, rudder and elevator controls 11 and 12 are associated with the tail structure. The craft further includes a tail skid 13 and suitable landing gear indicated generally by the reference numeral 14. At this point it should be noted that the landing gear here shown is not a part of the present invention per se, but is described and claimed in the copending application of Agnew E. Larsen, Serial No. 528,280, filed April 7th, 1931.

The sustaining rotor itself includes a plurality of blades or wings 15 which are articulated to the hub structure 16 by means of substantially horizontally disposed pivot pins 17 as well as substantially vertically disposed pivot pins 18. Attention is here called to the fact that in Figures 1, 2 and 6 I have included a showing of only two rotor blades. This has been done for the sake of clarity in the drawings, although it should be understood that any convenient number, for example, four, may be employed. The individual blade articulations arranged in the manner brought out above permit the blades to assume various positions of equilibrium under the influence of various and varying forces to which they are subjected in flight operation. The rotation of the rotor system is effected by relative airflow while in flight.

The hub structure 16 is arranged for rotation about the substantially vertically extended axis structure 19. The hub may also be provided with an upwardly extended mast 20 to which the blade droop supporting cables 21 may be attached at their upper and inner ends. Fastening devices 22 for the droop cables 21 are preferably mounted on the blades 15 at points spaced substantially from the hub. It might here be noted that these droop supports are arranged in such manner as to prevent fouling of the blades on any other portion of the craft, such, for example, as the propeller or the tail structure, when the blades are at rest. The supporting cables, however, are arranged to permit entire freedom of blade movement during normal flight operation, such flight operation involving, in addition to common rotation of the blades about the axis structure, individual blade movements on their independent vertical and horizontal pivot axes 18 and 17.

As disclosed in the copending application of Juan de la Cierva, Serial No. 414,901, filed December 18th, 1929, craft of this type may also be provided with laterally extended fixed wings 23 having upturned tips 24. In Figures 1 and 2 these wings 23 are illustrated as having their longitudinal spars braced to the fuselage by tension members or wires 25. Additionally, the landing gear 14 is interbraced with these wings as by means of tension elements 26 and 27—27, the landing gear further including compression struts 28—28 and 29—29. The compression elements 28 and 29 are arranged in pairs which are pivoted to each other, the latter (29) serving to support or carry the landing wheels 30—30. Shock absorbers 31 are interposed between the compression members 29 and the fixed wings 23, the upper ends of the absorbers preferably being arranged at points adjacent to the points of attachment or intersection of the tension members 25—25 and 27—27, as indicated at 32.

I have arranged the rotor mounting structure of the present invention forwardly of the cockpit 33 as clearly illustrated in Figures 2 and 3, the mounting structure being disposed substantially centrally between the two sides of the fuselage. The mounting structure itself takes the form of a hollow streamlined post element generally indicated by the reference numeral 34. the post structure of the present invention is arranged with its larger cross sectional dimension extended generally fore and aft of the body of the craft. From the standpoint of manufacture I prefer to fabricate the mount from sheet metal which is first suitably cut and then bent and deformed into a tubular post of the configuration illustrated in the drawings. After proper deformation and bending, two edges of the sheet are disposed adjacent to each other at the trailing edge of the post and are welded together as indicated at 35.

From inspection particularly of Figures 1 and 2 it will be seen that the major vertical extension of the post is of progressively decreasing cross sectional area toward its upper end. On the other hand, approaching the lower end of the post, the taper is substantially increased to produce a materially flared or flange portion 36. This increase in the taper or flare toward the lower end is carried out not only transversely of the craft but longitudinally thereof as well. As a result, an attachment or securing flange is provided on all four sides of the squared base portion 36.

This attachment flange, furthermore, is of such dimensions as to span the upper fuselage longérons 37 (see Fig. 3, particularly). Various parts of the fuselage are also constructed so that the base 36 spans or bridges a pair of adjacent fuselage cross braces 38. If desired, the base may be secured to the fuselage longérons and cross braces by means of bolts or rivets, although I prefer to provide a welded joint between the fuselage elements and the side flanges of the base 36. The major portion of the lower flared end of the post lies beneath the normal fuselage covering 7a which is faired in to the post contour, as clearly seen in Figures 1 and 2.

In order to brace or strengthen the lower fuselage structure to a point adjacent the attachment of the rotor mount, I prefer to employ diagonal members 39 extended downwardly from the longérons 37 to the vertical bracing members 40 (see Figs. 2 and 3). In these figures the lower fuselage longérons are indicated at 41. If desired, additional triangulated bracing elements 42 may be extended between the upper longérons 37 inwardly and forwardly to be secured to the cross brace 38 at the forward side of the cockpit 33 adjacent the flared bottom of the post.

The rotor axis mechanism may be associated with the upper end of the streamlined post 34 in any suitable manner, although I prefer to form the opening in the uppermost end of the post or pylon of such internal dimensions as to receive and closely engage a downwardly projecting portion of the axis mechanism (see Figs. 1 and 5). If desired, the axis mechanism may be permanently secured to the post although, as illustrated in Figures 1, 2 and 5, I prefer to adopt an attachment means which provides for ready removal of the entire rotor, including its axis mechanism, as a unit. As here shown, this means includes a pin or bolt 43 extended transversely through the post itself, through the internal socket-like lugs 34b thereof, and through the depending portion of the axis member 19. The nut 44 may be tightly drawn up to provide rigid engagement of the axis structure by the inner surfaces of the lugs; the nut and the bolt head being countersunk or fitted in recesses, as shown. A cotter or a locking wire 45 may also be employed. With an arrangement of this type, the entire rotor may be removed as a unit by the mere displacement of a single securing pin.

Turning again to Figure 3, it will be seen that the seating arrangements which I provide include a pair of pilot or passenger seats 46—46, disposed in the cockpit 33 side by side. This arrangement, of course, results in an offset of each seat, laterally of the craft, with respect to the mounting structure 34. With the height of the seats properly arranged with respect to the upper fuselage longérons and the base 36 of the rotor mounting post, and with the taper or curvature of the post walls properly arranged, and with the major portion of the large flared end of the post lying within the fuselage fairing, very good forward vision is provided from either one of the two seats, as will be apparent from inspection of Figures 1 and 3.

Attention is here called to the fact that I prefer to construct the rotor mount of material having sufficient inherent strength and rigidity to adequately support the rotor as against all normal thrusts, forces and strains to which it is subjected in flight operation. It is particularly noted that the post constucted in accordance with the present invention has sufficient strength or rigidity as against lateral strains to make it unnecessary to employ auxiliary or supplemental tension or other bracing means extended laterally of the craft. The post, of course, also has adequate rigidity to firmly support the rotor as against strains occurring generally fore and aft of the craft, it being noted that the streamline cross section of the post materially enhances this rigidity fore and aft.

However, if desired, the post may be made of somewhat lighter material, in which case, I contemplate employing lateral tension bracing wires 47 (see Fig. 6). In this modified structure, the post takes the same general form as that illustrated in Figures 1 to 5 inclusive and, in a structure such as shown in Figure 6, I contemplate fabricating the post of sheet metal of the lighter material but still having sufficient inherent rigidity to adequately support the rotor as against forces or strains generally fore and aft of the craft. The lateral tension bracing elements 47, above referred to, extend from an upper portion of the post (34a in Fig. 6) preferably to points 32a at which the landing gear shock absorbers 31 and tension wires 27 are connected, these points, of course, being disposed along the longitudinal fixed wing spars as in the arrangement of Figures 1 and 2.

By comparison of Figures 1 and 6, it will be seen that I have not only provided tension wires 47, in the arrangement of Figure 6, for the rotor mount but, in addition, have eliminated (in Fig. 6) the wires 25 described above in connection with Figure 1. Since in this arrangement the wires 47—47 are not attached to the fuselage, it may be desirable to employ additional cross wires 48—48 in the landing gear. The arrangement of Figure 6 results in the disposition of a tension bracing system extended entirely around the body of the craft, this system being composed of wires 47—47, 27—27 and 26. This system, it will be noted, interbraces the landing gear, the fixed wings, and the rotor mount, fixation of the struts 28 being obtained by the wires 48—48. Great strength and rigidity in various of these elements is afforded by this arrangement, it being noted that the disposition of the wires 27 and 47 as indicated at each side of the craft results in very effective triangulated bracing.

In considering the advantages of the structure illustrated in Figures 1 to 5 inclusive, it should be observed, in the first instance, that greatly improved aero-dynamical efficiency results from the use of a single streamlined rotor mount, the arrangement being such as to afford the additional advantage of improved general appearance (all tension bracing elements being completely eliminated), without sacrificing good forward vision for a pilot or other occupant. At the same time, substantial advantages in the matter of construction and assembly are afforded, as the single post may readily be fabricated from suitable commercial sheet metal.

On the other hand, the structure of Figure 6 may be adopted where it is desired to keep the weight of the rotor mount at a minimum, this form resulting in additional advantages incident to the improved type of tension bracing arrangements for the fixed wings, landing gear and rotor mount itself.

Both forms afford a further advantage in providing a means whereby the entire rotor system may conveniently be removed from the craft, as a unit, for purposes of inspection, lubrication, repair or the like.

What I claim is:—

1. An aircraft having a body or fuselage and a set of sustaining blades arranged for rotation on an upwardly extended axis, spaced fuselage longérons, spaced fuselage cross braces interconnecting the longérons, and a mounting structure for the sustaining blades including a post element having laterally extended flange means squared to bridge and fit said spaced longérons and said spaced braces and secured thereto.

2. In an aircraft having a sustaining rotor disposed above angularly arranged spaced structural members of the body of the craft defining an angular figure when viewed in plan, a mounting structure for the rotor consisting of a one piece streamlined post element of smaller cross-sectional area in an upper portion than in a lower portion thereof, the element being tapered between said portions and the taper being progressively increased toward the lower portion to provide a materially flared substantially horizontal flange portion spanning or bridging said spaced members, and said flange portion further being angular in plan form to fit said figure.

3. For an aircraft having forward propulsion means and, as its primary means of sustension, a normally air driven sustaining rotor, a spindle about which it rotates, in which construction, during translational flight as induced by the propulsion means, forces and stresses are set up generally transverse the rotor axis by virtue of drawing the rotor through the air in a generally edgwise position, a stressed skin pylon for mounting the rotor spindle and through which the thrust of sustension of the craft and the normal lateral or horizontal strains incident to translational flight as induced by the propulsion means and also to other flight maneuvers are transmitted to the body of the craft, said pylon being in the form of a hollow post element of streamline cross section and further being tapered throughout a considerable portion of its length to provide a wide base for attachment to the body of the craft, whereby material inherent strength and rigidity are afforded to resist thrusts and forces to which the pylon is subjected in translational flight as induced by the propulsion means and also in various other maneuvers as well as in landing and to transmit such thrusts and forces to the fuselage through said wide base, the upper portion of the post being of relatively small cross sectional dimensions and having a shorter cross sectional axis approximating the cross sectional dimension of the rotor spindle, whereby there is a minimum of interference with the normal air-flow which actuates the rotor.

4. An aircraft having forward propulsion means and, as its primary means of sustension, a normally air driven sustaining rotor disposed above its body to rotate in a generally horizontal position, in which construction, during translational flight as induced by the propulsion means, forces and stresses are set up generally transverse the rotor axis, fore and aft of the craft, by virtue of drawing the rotor through the air in a generally edgewise position and in which, during banking and other flight maneuvers, forces and stresses are set up generally transverse the rotor axis, laterally of the craft, a mounting structure for the rotor including a post element of hollow streamline form having major and minor cross sectional axes, the former of which is positioned fore and aft of the craft, the element being connected with the body structure and extended upwardly therefrom, the said rotor, said element and the body of the craft being serially interconnected in a manner to provide for the transmission of the thrust of sustension through the said element to the body of the craft, and said element having sufficient inherent strength and rigidity to carry the major fore and aft forces and stresses, as induced by the forward propulsion means during translational flight, and bracing means cooperating with the post element and extended generally laterally of the craft, whereby to brace said post element as against forces and stresses laterally of the craft as set up during banking and other flight maneuvers.

HAROLD F. PITCAIRN.